United States Patent
Yasuda

(10) Patent No.: US 9,222,021 B2
(45) Date of Patent: Dec. 29, 2015

(54) LIQUID-CRYSTAL DISPLAY DEVICE

(75) Inventor: Kotaro Yasuda, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 139 days.

(21) Appl. No.: 12/680,075

(22) PCT Filed: Sep. 26, 2008

(86) PCT No.: PCT/JP2008/067979
§ 371 (c)(1),
(2), (4) Date: Mar. 25, 2010

(87) PCT Pub. No.: WO2009/041720
PCT Pub. Date: Apr. 2, 2009

(65) Prior Publication Data
US 2010/0208175 A1    Aug. 19, 2010

(30) Foreign Application Priority Data

Sep. 27, 2007 (JP) .................. 2007-251971
Mar. 28, 2008 (JP) .................. 2008-085530

(51) Int. Cl.
| | | |
|---|---|---|
| G02F 1/1335 | (2006.01) | |
| C09K 19/04 | (2006.01) | |
| G02F 1/13363 | (2006.01) | |
| G02F 1/1343 | (2006.01) | |

(52) U.S. Cl.
CPC ............ *C09K 19/04* (2013.01); *G02F 1/13363* (2013.01); *G02F 1/133528* (2013.01); *G02F 1/134363* (2013.01); *G02F 2001/133637* (2013.01); *G02F 2202/40* (2013.01); *G02F 2203/60* (2013.01)

(58) Field of Classification Search
CPC .................................................. G02F 1/133528
USPC ........................................................... 349/96
See application file for complete search history.

(56) References Cited

U.S. PATENT DOCUMENTS

| | | | |
|---|---|---|---|
| 6,115,096 | A | 9/2000 | Suzuki et al. |
| 6,184,957 | B1 | 2/2001 | Mori et al. |
| 6,285,429 | B1 | 9/2001 | Nishida et al. |

(Continued)

FOREIGN PATENT DOCUMENTS

| | | |
|---|---|---|
| CN | 101001910 A | 7/2007 |
| JP | 9-080424 A | 3/1997 |

(Continued)

OTHER PUBLICATIONS

International Search Report (PCT/ISA/210) for PCT/JP2008/67979 dated Jan. 20, 2009.

(Continued)

*Primary Examiner* — Sung Pak
*Assistant Examiner* — Chris Chu
(74) *Attorney, Agent, or Firm* — Buchanan, Ingersoll & Rooney PC

(57) ABSTRACT

Disclosed is a liquid-crystal display device comprising a polarizing plate comprising a polarizing element and a thermoplastic-resin film which comprises a lactone ring-having polymer and satisfies the following formulas (I) and (II): (I) $0=|Re(630)|=10$, and $|Rth(630)|=25$ (II) $|Re(400)-Re(700)|=10$, and $|Rth(400)-Rth(700)|=35$ wherein $Re(?)$ means retardation (nm) in plane at a wavelength ? nm; and $Re(?)$ means retardation (nm) along the thickness direction at a wavelength ? nm.

24 Claims, 1 Drawing Sheet

(56) References Cited

U.S. PATENT DOCUMENTS

| | | | |
|---|---|---|---|
| 6,285,430 | B1 | 9/2001 | Saito |
| 8,394,504 | B2 | 3/2013 | Ito et al. |
| 2008/0139803 | A1 | 6/2008 | Sasada |
| 2009/0137743 | A1* | 5/2009 | Ito et al. .................. 525/223 |
| 2009/0153965 | A1 | 6/2009 | Ito et al. |

FOREIGN PATENT DOCUMENTS

| | | |
|---|---|---|
| JP | 9-292522 A | 11/1997 |
| JP | 10-054982 A | 2/1998 |
| JP | 10-307291 A | 11/1998 |
| JP | 11-133408 A | 5/1999 |
| JP | 11-202323 A | 7/1999 |
| JP | 11-305217 A | 11/1999 |
| JP | 2004-148811 | 5/2004 |
| JP | 2006-030937 | 2/2006 |
| JP | 2006-030937 A | 2/2006 |
| JP | 2006-096960 | 4/2006 |
| JP | 2006-178226 | 7/2006 |
| JP | 2006-215535 | 8/2006 |
| JP | 2006-227606 A | 8/2006 |
| JP | 2006-292895 | 10/2006 |
| JP | 2007-119565 A | 5/2007 |
| JP | 2007-127892 A | 5/2007 |
| TW | 2005 30314 A | 9/2005 |
| TW | 200612115 A | 4/2006 |
| WO | WO2005/111675 A1 | 11/2005 |
| WO | WO 2005111675 * | 11/2005 |
| WO | WO 2006/068311 A1 | 6/2006 |
| WO | 2006-112207 A1 | 10/2006 |

OTHER PUBLICATIONS

Extended Search Report from European Patent Office issued in corresponding European Patent Application No. 08833448.7, dated Dec. 3, 2010.
English-language version of the International Preliminary Report on Patentability and Attached Written Opinion (Forms PCT/IB/326, PCT/IB/373 and PCT/ISA/237) mailed by the International Bureau on Apr. 8, 2010 in corresponding PCT/JP2008/067979.
Chinese Office Action dated Dec. 20, 2011, issued in the corresponding Chinese Patent Application No. 200880117715.8, and English Translation thereof. (7 pages).
Submission of documents dated May 23, 2011 in corresponding Japanese Patent Application No. 2008-85530 with an English translation thereof.
Office Action issued Aug. 7, 2012 in corresponding Japanese Patent Application No. 2008-085530 with an English translation thereof.
Third Party Submission of Publications filed in corresponding Japanese Patent Application No. 2012-224175 dated Jul. 16, 2013 with English translation.
Third Party Submission of Publications filed in corresponding Japanese Patent Application No. 2008-085530 dated Jul. 23, 2013 with English translation.
Official Action issued in corresponding Taiwanese Patent Application No. 097137090 dated Oct. 24, 2013 with English translation.
Decision of Refusal issued in Japanese Patent Application No. 2012-224175 dated Aug. 27, 2013.
Questioning Issued on Appeal No. 2013-10704 issued in Japanese Patent Application No. 2008-85530 dated Sep. 10, 2013.
English Translation of claims and paragraphs [0010] through [0036] of JP 10-307291.
Decision of Refusal dated Mar. 12, 2013 in corresponding Japanese Patent Application No. 2008-85530, with an English translation thereof.
Office Action issued Mar. 12, 2013 in corresponding Japanese Patent Application No. 2012-224175, with an English translation thereof.
Official Action issued in corresponding European Application No. 08 833 448.7 dated Sep. 23, 2013.
Office Action from the Taiwanese Patent Office, issued on May 26, 2014, in corresponding Taiwanese Patent Application No. 097137090 and its English translation of the Office Action. (18 pages).
Office Action issued in corresponding Japanese application No. 2013-243450 on Oct. 10, 2014 (10 pages).
Office Action (Notification of the First Office Action) issued on Apr. 16, 2014, by the Chinese Patent Office in corresponding Chinese Patent Application No. 201210197061.2 and an English translation of the Office Action. (15 pages).
Office Action from the Korean Patent Office, issued on Aug. 14, 2014, in corresponding Korean Patent Application No. 2013-7025320 and its English translation of the Office Action. (12 pages).
Office Action from the Korean Patent Office, issued on Aug. 13, 2014, in corresponding Korean Patent Application No. 2010-7009018 and its English translation of the Office Action. (12 pages).
Office Action issued by the Chinese Patent Office in corresponding Chinese Patent Application No. 201310303246.1 on Jul. 3, 2015 (19 pages including English translation).
Office Action issued by the Japanese Patent Office in corresponding Japanese Patent Application No. 2014-258541 on Sep. 25, 2015 (8 pages including English translation).
Office Action issued by the Chinese Patent Office in corresponding Chinese Patent Application No. 201310302985.9 on Aug. 3, 2015 (17 pages).

* cited by examiner

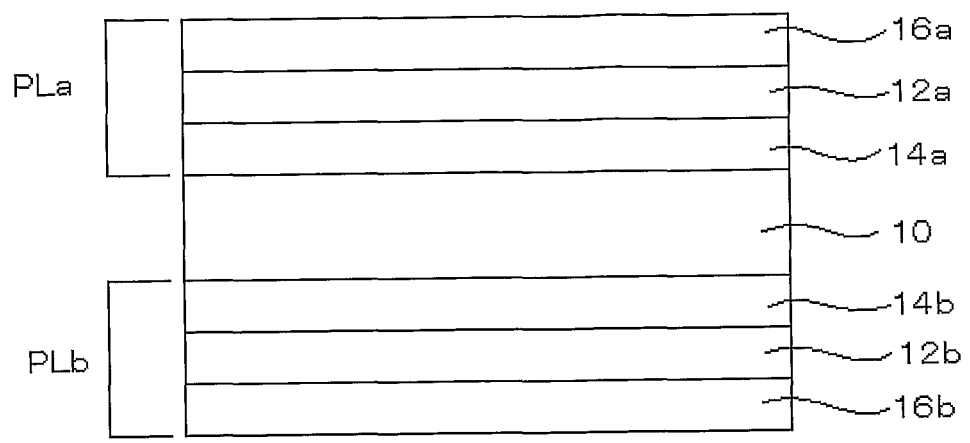

LIQUID-CRYSTAL DISPLAY DEVICE

BACKGROUND OF THE INVENTION

1. Technical Field of the Invention

The present invention relates to a liquid-crystal display device, in particular to a liquid-crystal display device, employing an in-plane switching-mode, in which an electric field is applied to the horizontally-aligned nematic liquid crystal laterally.

2. Related Art

An in-plane switching (IPS)-mode liquid-crystal display device has been proposed in which a lateral electric field is applied to the liquid crystal. Recently, the liquid-crystal display device employing the mode has been developed for use for TVs, and with that, the panel brightness thereof has become greatly increased. Accordingly, even slight light leakage in diagonal oblique directions in the black state, which has heretofore been almost disregarded in IPS-mode devices, has become considered a cause of deterioration of display image quality in the devices.

For improving the color expression of IPS-mode display devices and for improving the viewing angle characteristics thereof in the black state, some methods of disposing an optical compensatory material having birefringent characteristics between the liquid-crystal layer and the polarizer have been tried. And some methods of making a protective film of the polarizer capable of functioning as an optical compensation have also been tried for example, see JPA Nos. hei 9-80424, hei 10-54982, hei 11-202323, hei 9-292522, hei 11-133408, hei 11-305217, hei 10-307291 and 2006-227606.

SUMMARY OF THE INVENTION

However, even according to the methods proposed as in the above, the optical characteristics (especially Rth) of the retardation film vary depending on the ambient temperature; and therefore there are problems in that, depending on the condition for viewing them, the display characteristics of liquid-crystal display devices may greatly vary and Δnd of the liquid-crystal cell in the devices may be noticeably uneven. Some retardation films suffer from increasing the absolute values of their optical characteristics (especially Re) depending on temperature- or humidity-change; and the increase in the absolute value of Re may augment the molecular axis fluctuation that a retardation film necessarily has, therefore causing a reason of lowering front contrast which means contrast in the normal line direction to the displaying plane.

The present invention has been made in consideration of the above-mentioned various problems, and its object is to provide a liquid-crystal display device, in particular an IPS-mode liquid-crystal display device, that is free from a problem of display performance fluctuation to be caused by temperature- or humidity-change.

Another object of the invention is to provide a liquid-crystal display device, in particular an IPS-mode liquid-crystal display device, that is free from problems of color shift in oblique directions and front contrast reduction to occur depending on the environment humidity and temperature.

The means for achieving the above mentioned objects are as follows.

[1] A liquid-crystal display device comprising:
a liquid-crystal cell which comprises:
a pair of substrates disposed to face each other having an electrode on at least one of them, the electrode capable of forming an electric field containing a component running in parallel to the substrate, and
a liquid-crystal layer, of which alignment is controlled, disposed between the pair of substrates; and
a pair of polarizing plates disposed to sandwich the liquid-crystal cell therebetween,
wherein at least one of the pair of polarizing plates comprises a polarizing element and a thermoplastic-resin film which comprises a lactone ring-having polymer and satisfies the following formulas (I) and (II):

$$0 \leq |Re(630)| \leq 10, \text{ and } |Rth(630)| \leq 25 \tag{I}$$

$$|Re(400)-Re(700)| \leq 10, \text{ and } |Rth(400)-Rth(700)| \leq 35 \tag{II}$$

wherein $Re(\lambda)$ means retardation (nm) in plane at a wavelength $\lambda$ nm; and $Rth(\lambda)$ means retardation (nm) along the thickness direction at a wavelength $\lambda$ nm.

[2] The liquid-crystal display device as set forth in [1], wherein a polarizing plate disposed at the backlight side, at least, is said polarizing plate comprising the thermoplastic-resin film.

[3] The liquid-crystal display device as set forth in [1], wherein a polarizing plate disposed at the displaying plane side, at least, is said polarizing plate comprising the thermoplastic-resin film.

[4] The liquid-crystal display device as set forth in [1], wherein both of polarizing plates disposed at the backlight side and the displaying plane side are said polarizing plates comprising the thermoplastic-resin film.

[5] The liquid-crystal display device as set forth in any one of [1] to [4], wherein Re{T} and Rth{T} (T means the temperature (° C.) at which the data is measured) of the thermoplastic-resin film at a wavelength of 550 nm satisfy the following formulas (III) and (IV):

$$|Re\{50\}-Re\{25\}|<5, \tag{III}$$

$$|Rth\{50\}-Rth\{25\}|<10. \tag{IV}$$

[6] The liquid-crystal display device as set forth in any one of [1] to [5], wherein Re[H] and Rth[H] (H means the relative humidity (%) at which the data is measured) of the thermoplastic-resin film at a wavelength of 550 nm satisfy the following formulas (V) and (VI):

$$|Re[80]-Re[10]|<5, \tag{V}$$

$$|Rth[80]-Rth[10]|<10. \tag{VI}$$

BRIEF DESCRIPTION OF THE DRAWINGS

FIG. 1 is a schematic cross-sectional view of one example a liquid-crystal display device of the invention.

In the drawing, the reference numerals have the following meanings.
10 IPS-mode liquid-crystal cell
12a, 12b Polarizing element
14a, 14b Protective film on liquid-crystal cell side
16a, 16b Outer protective film
PLa Polarizing plate on panel side
PLb Polarizing plate on back side

PREFERRED EMBODIMENT OF THE INVENTION

The invention is described in detail hereinunder.
In this description, the numerical range expressed by the wording "a number to another number" means the range that falls between the former number indicating the lowermost limit of the range and the latter number indicating the uppermost limit thereof.

In the description, Re(λ) and Rth(λ) each indicate retardation in plane (unit:nm) and retardation along thickness direction (unit:nm) at a wavelength λ. Re(λ) is measured by applying a light having a wavelength of λ nm in the normal line direction of a sample such as a film, using KOBRA-21ADH or WR (by Oji Scientific Instruments).

When the sample to be tested is represented by an uniaxial or biaxial refractive index ellipsoid, then its Rth(λ) is calculated according to the method mentioned below.

With the in-plane slow axis (determined by KOBRA 21ADH or WR) taken as the inclination axis (rotation axis) of the sample (in case where the sample has no slow axis, the rotation axis of the sample may be in any in-plane direction of the sample), Re(λ) of the sample is measured at 6 points in all thereof, up to +50° relative to the normal line direction of the sample at intervals of 10°, by applying a light having a wavelength of λ nm from the inclined direction of the sample.

With the in-plane slow axis from the normal line direction taken as the rotation axis thereof, when the sample has a zero retardation value at a certain inclination angle, then the symbol of the retardation value of the sample at an inclination angle larger than that inclination angle is changed to a negative one, and then applied to KOBRA 21ADH or WR for computation.

With the slow axis taken as the inclination axis (rotation axis) (in case where the sample has no slow axis, the rotation axis of the sample may be in any in-plane direction of the film), the retardation values of the sample are measured in any inclined two directions; and based on the data and the mean refractive index and the inputted thickness of the sample, Rth may be calculated according to the following formulae (10) and (11):

$$Re(\theta) = \left[ nx - \frac{ny \times nz}{\sqrt{\left\{ ny \sin\left(\sin^{-1}\left(\frac{\sin(-\theta)}{nx}\right)\right)\right\}^2 + \left\{nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad (10)$$

$$Rth = \{(nx + ny)/2 - nz\} \times d \quad (11)$$

wherein Re(θ) means the retardation value of the sample in the direction inclined by an angle θ from the normal line direction; nx means the in-plane refractive index of the sample in the slow axis direction; ny means the in-plane refractive index of the sample in the direction vertical to nx; nz means the refractive index of the sample vertical to nx and ny; and d is a thickness of the sample.

When the sample to be tested can not be represented by a monoaxial or biaxial index ellipsoid, or that is, when the sample does not have an optical axis, then its Rth(2) may be calculated according to the method mentioned below.

With the in-plane slow axis (determined by KOBRA 21ADH or WR) taken as the inclination axis (rotation axis) of the sample, Re(λ) of the sample is measured at 11 points in all thereof, from −50° to +50° relative to the normal line direction of the sample at intervals of 10°, by applying a light having a wavelength of λ nm from the inclined direction of the sample. Based on the thus-determined retardation data of Re(λ), the mean refractive index and the inputted thickness of the sample, Rth(λ) of the sample is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In the invention, "slow axis" of the retardation film and others means the direction in which the refractive index is the largest. "Visible light region" is from 380 nm to 780 nm. Unless otherwise specifically indicated, the wavelength at which a refractive index is measured is λ=550 nm in a visible light region.

In this description, the numerical data, the numerical ranges and the qualitative expressions (for example, expressions of "equivalent", "equal") that are shown optical characteristics of respective members such as a retardation film and a liquid crystal layer should be interpreted to indicate the numerical data, the numerical ranges and the properties including errors that are generally acceptable for liquid-crystal display devices and their constitutive members.

FIG. 1 is a schematic cross-sectional view of one example of a liquid-crystal display device of the invention. In this drawing, however, the relative relation in the thickness between the constitutive layers does not always reflect the real relative relation therebetween. In the drawing, the top indicates the displaying plane side, and the bottom indicates the back side (backlight side).

The liquid-crystal display device shown in FIG. 1 comprises an IPS-mode liquid-crystal cell 10, and a pair of polarizing plates PLa and PLb on and below it. The polarizing plates PLa and PLb each comprise a polarizing element 12a or 12b, and a liquid-crystal cell-side protective film 14a or 14b and an outer protective film 16a or 16b for protecting it. In this example, at least one of the protective films 14a, 14b, 16a and 16b is a thermoplastic-resin film containing a lactone ring-having polymer that satisfies a predetermined formula. Preferably, at least one of the liquid-crystal cell-side protective films 14a and 14b is the thermoplastic-resin film; and more preferably both of them are the thermoplastic-resin film. The outer protective films 16a and 16b may also be the thermoplastic-resin film, or may be any other polymer film such as a cellulose acylate film, a polycarbonate film, a norbornene-based film or the like.

In this example, the above-mentioned thermoplastic-resin film is used as at least one of the protective films 14a, 14b, 16a and 16b, thereby producing the liquid-crystal display device free from a problem of display performance fluctuation depending on the ambient temperature and humidity change.

The IPS-mode liquid-crystal cell 10 is not specifically limited, and may be any one in which the electrode formed inside the cell may generate an electric field having a component parallel to the substrate. For it, for example, any ordinary IPS-mode liquid-crystal cell is usable. The angle of the electric field direction to the surface of the cell substrate is preferably at most 20 degrees, more preferably at most 10 degrees, or that is, it is desirable that the electric field is substantially parallel to the substrate surface. The electrode may be formed separately on the upper and lower substrates, or may be formed only on one substrate. The electrode may have a structure of two layers combined via an insulating layer therebetween. Of the two-layered electrode, the electrode of the lowermost layer may be a non-patterned electrode or a linear electrode. The upper electrode is preferably linear, but may have any other form of a network, spiral or dotted form through which the electric field from the lower layer electrode can pass; and a floating electrode having a neutral potential may be further added to the structure. The insulating layer may be formed of an inorganic material such as SiO or a nitride film, or an acrylic or epoxy-based organic material.

The liquid-crystal material to be used in the liquid-crystal cell may be a nematic liquid crystal having a positive dielectric anisotropy $\Delta\in$. The thickness (gap) of the liquid-crystal layer may be controlled by polymer beads. Glass beads, fibers as well as resinous columnar spacers may form the same gap. In an IPS-mode liquid-crystal cell, in general, the product of the thickness d (μm) of the liquid-crystal layer and the refractive anisotropy Δn thereof, Δn·d may be from 0.2 to 1.2 μm or so; and for satisfying the requirement for device thickness reduction, this may be from 0.2 to 0.5 μm or so in the invention.

Materials for use in producing various members usable in the liquid-crystal display device of the invention, and a method for producing the device are described in detail hereinunder.

[Thermoplastic-Resin Film Containing Lactone Ring-Having Polymer]

In the invention, used is a polarizing plate comprising a thermoplastic-resin film containing a lactone ring-having polymer, and the film satisfies the following formulas (I) and (II). The thermoplastic-resin film is preferably a protective film of a polarizing element, and more preferably, it is a protective film thereof disposed on the side of the liquid-crystal cell.

$$0 \leq |Re(630)| \leq 10, \text{ and } |Rth(630)| \leq 25 \qquad (I)$$

$$|Re(400)-Re(700)| \leq 10, \text{ and } |Rth(400)-Rth(700)| \leq 35 \qquad (II)$$

By compensating birefringence of the IPS-mode liquid-crystal cell with retardation falling within the range satisfying the above formulas (I) and (II), the color shift to occur in the oblique direction in the black state may be thereby reduced. The present inventors have found that the thermoplastic-resin film containing the specific lactone ring-having polymer may satisfy the above-mentioned condition, and that, when the film is used as an optical compensation film for an IPS-mode liquid-crystal cell, then the optical performance fluctuation depending on the ambient temperature/humidity change may be reduced, or that is, the optical compensation fluctuation may be thereby reduced. A birefringent polymer film is generally so controlled that the constitutive molecules may be aligned in one direction by stretching it; but naturally, the molecular axis direction in the stretched film may fluctuate and the molecular axes therefore fluctuate in the film. In particular, when the absolute value of Re increases owing to the environmental temperature/humidity change, then the axial shift may become great, therefore causing retardation unevenness, and this is one reason for the front contrast reduction (e.g., light leakage in the normal line direction to the displaying plane in the black state). In the invention, used is a thermoplastic-resin film that contains a lactone ring-having polymer and has a small absolute value of Re. Accordingly, the absolute value of Re of the film in the invention may be made nearer to almost 0 (zero) and the optical performance fluctuation depending on the ambient temperature/humidity environment change of the film may be reduced, and as a result, the molecular axis direction fluctuation inevitable in a retardation polymer film is thereby prevented from surfacing. The thermoplastic-resin film, containing a lactone ring-having polymer, may have $|Re(630)|$ of being equal to or less than 5 nm and $|Rth(630)|$ of being equal to or less than 15 nm. For more ideal optical compensation in the IPS-mode liquid-crystal cell in the invention, preferably, $|Re(400)-Re(700)|$ is equal to or less than 5 nm and $|Rth(400)-Rth(700)|$ is equal to or less than nm. The thermoplastic-resin film, containing a lactone ring-having polymer, satisfies the optical characteristics.

Preferably, Re and Rth of the thermoplastic-resin film do not change depending on the ambient temperature. Preferably, $Re\{T\}$ and $Rth\{T\}$ (T means the temperature (° C.) at which the data is measured) of the thermoplastic-resin film at a wavelength of 550 nm satisfy the following formulas (III) and (IV), $$|Re\{50\}-Re\{25\}|<5 \qquad (III)$$

$$|Rth\{50\}-Rth\{25\}|<10 \qquad (IV)$$

and more preferably the following formulas (III)' and (IV)'.

$$|Re\{50\}-Re\{25\}|<3 \qquad (III)'$$

$$|Rth\{50\}-Rth\{25\}|<5 \qquad (IV)'$$

In measuring $Re\{T\}$ and $Rth\{T\}$, the film is left at the temperature T° C. for at least 1 hour, and then measured.

Preferably, Re and Rth of the thermoplastic-resin film do not change depending on the ambient humidity. Preferably, $Re[H]$ and $Rth[H]$ (H means the relative humidity (%) at which the data is measured) of the thermoplastic-resin film at a wavelength of 550 nm satisfy the following formulas (V) and (VI), $$|Re[80]-Re[10]|<5 \qquad (V)$$

$$|Rth[80]-Rth[10]|<10 \qquad (VI)$$

and more preferably the following formulae (V)' and (VI)'.

$$|Re[80]-Re[10]|<3 \qquad (V)'$$

$$|Rth[80]-Rth[10]|<5 \qquad (VI)'$$

In measuring $Re[H]$ and $Rth[H]$, the film is left at the humidity H for at least 1 hour, and then measured.

The major ingredient of the thermoplastic-resin film is selected from lactone ring-having polymers, and preferably, selected from polymers having a lactone ring structure of the following formula (1):

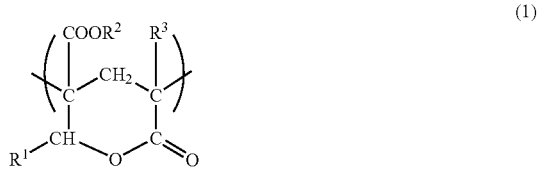

In the formula, $R^1$, $R^2$ and $R^3$ each independently represent a hydrogen atom, or an organic residue having from 1 to 20 carbon atoms. The organic residue may contain an oxygen atom.

The content of the lactone ring structure of formula (1) in the lactone ring-having polymer structure is preferably from 5 to 90% by mass, more preferably from 10 to 70% by mass, even more preferably from 10 to 60% by mass, still more preferably from 10 to 50% by mass. When the content of the lactone ring structure of formula (1) in the lactone ring-having polymer structure is at least 5% by mass, then the film may have sufficient heat resistance, solvent resistance and surface hardness. When the content of the lactone ring structure of formula (1) in the lactone ring-having polymer structure is at most 90% by mass, then the polymer may have better shapability and processability.

The lactone ring-having polymer may have any other structure than the lactone ring structure of formula (1). Not specifically defined, examples of the structure other than the lactone ring structure of formula (1) preferably include polymer structure units (repetitive structure units) to be constructed by polymerization of at least one selected from (meth)acrylates, hydroxyl group-containing monomers, unsaturated carboxylic acids and monomers of the following formula (2), as described hereinunder.

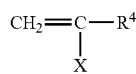
(2)

In the formula, $R^4$ represents a hydrogen atom or a methyl group; X represents a hydrogen atom, an alkyl group having from 1 to 20 carbon atoms, an aryl group, an acetate group (—OAc; Ac represents an acetyl)), a cyano group (—CN), a group —CO—$R^5$ or a group —CO—O—$R^6$; $R^5$ and $R^6$ each represent a hydrogen atom or an organic residue having from 1 to 20 carbon atoms.

The content of the other structure than the lactone ring structure of formula (1) in the lactone ring-having polymer structure is preferably from 10 to 95% by mass, more preferably from 10 to 90% by mass, even more preferably from 40 to 90% by mass, still more preferably from 50 to 90% by mass, when the other structure is a polymer structure unit (repetitive structure unit) constructed by polymerization of a (meth)acrylate; the content is preferably from 0 to 30% by mass, more preferably from 0 to 20% by mass, even more preferably from 0 to 15% by mass, still more preferably from 0 to 10% by mass, when the other structure is a polymer structure unit (repetitive structure unit) constructed by polymerization of a hydroxyl group-containing monomer. When the other structure is a polymer structure unit (repetitive structure unit) constructed by polymerization of an unsaturated carboxylic acid, its content is preferably from 0 to 30% by mass, more preferably from 0 to 20% by mass, even more preferably from 0 to 15% by mass, still more preferably from 0 to 10% by mass. When the other structure is a polymer structure unit (repetitive structure unit) constructed by polymerization of a monomer of formula (2), its content is preferably from 0 to 30% by mass, more preferably from 0 to 20% by mass, even more preferably from 0 to 15% by mass, still more preferably from 0 to 10% by mass.

The production method for the lactone ring-having polymer is not specifically limited. For example, the polymer may be prepared as follows. A polymer (a) having a hydroxyl group and an ester group in the molecular chain is prepared by polymerization, and then subjected to a thermal treatment to carry out a lactone ring-forming condensation reaction and to introduce a lactone ring structure into the polymer.

In the polymerization step, for example, a monomer composition containing a monomer of the following formula (3) may be polymerized to give a polymer having a hydroxyl group and an ester group in the molecular chain.

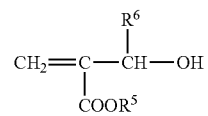
(3)

In the formula, $R^5$ and $R^6$ each independently represent a hydrogen atom or an organic residue having from 1 to 20 carbon atoms.

Examples of the monomer of formula (3) include methyl 2-(hydroxymethyl)acrylate, ethyl 2-(hydroxymethyl)acrylate, isopropyl 2-(hydroxymethyl)acrylate, n-butyl 2-(hydroxymethyl)acrylate, tert-butyl 2-(hydroxymethyl)acrylate. Of those, preferred are methyl 2-(hydroxymethyl)acrylate and ethyl 2-(hydroxymethyl)acrylate in point of their effect of improving heat resistance; and more preferred is methyl 2-(hydroxymethyl)acrylate. One or more different types of the monomers of formula (1a) may be used either singly or as combined.

The content of the monomer of formula (3) in the monomer composition to be polymerized in the polymerization step is preferably from 5 to 90% by mass, more preferably from 10 to 70% by mass, even more preferably from 10 to 60% by mass, still more preferably from 10 to 50% by mass. When the content of the monomer of formula (3) in the monomer composition to be polymerized in the polymerization step is at least 5% by mass, then the film may have sufficient heat resistance, solvent resistance and surface hardness. When content of the monomer of formula (3) in the monomer composition to be polymerized in the polymerization step is at most 90% by mass, then gellation may be prevented in lactone cyclization and a polymer having better shapability and processability may be obtained.

The monomer composition to be polymerized in the polymerization step may contain any other monomer than the monomer of formula (3). Not specifically defined, preferred examples of the other monomer include, for example, (meth) acrylates, hydroxyl group-containing monomers, unsaturated carboxylic acids, and monomers represented by formula (2). One or more such other monomers than the monomer of formula (1a) may be used herein either singly or as combined.

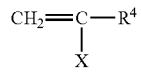
(2)

In the formula, $R^4$ represents a hydrogen atom or a methyl group; X represents a hydrogen atom, an alkyl group having from 1 to 20 carbon atoms, an aryl group, an acetate group (—OAc; Ac represents an acetyl)), a cyano group (—CN), a group —CO—$R^5$ or a group —CO—O—$R^6$; $R^5$ and $R^6$ each represent a hydrogen atom or an organic residue having from 1 to 20 carbon atoms.

Not specifically defined, the (meth)acrylates may be any (meth)acrylates except the monomer of formula (3), and examples of the (meth)acrylate include acrylates such as methyl acrylate, ethyl acrylate, n-butyl acrylate, isobutyl acrylate, tert-butyl acrylate, cyclohexyl acrylate, and benzyl acrylate; methacrylates such as methyl methacrylate, ethyl methacrylate, propyl methacrylate, n-butyl methacrylate, isobutyl methacrylate, tert-butyl methacrylate, cyclohexyl methacrylate, and benzyl methacrylate. One or more of these may be used either singly or as combined. Of those, especially preferred is methyl methacrylate as the film may have excellent heat resistance and transparency.

In the embodiment where the other (meth)acrylate than the monomer of formula (3) is used, its content in the monomer composition to be polymerized in the polymerization step is preferably from 10 to 95% by mass, more preferably from 10 to 90% by mass, even more preferably from 40 to 90% by mass, still more preferably from 50 to 90% by mass, for sufficiently exhibiting the effect of the invention.

Not specifically defined, the hydroxyl group-containing monomers may be any hydroxyl group-containing monomers except the monomer of formula (3), and examples of the hydroxyl group-containing monomer include α-hydroxymethylstyrene, α-hydroxyethylstyrene; (2-hydroxyalkyl)acrylates such as methyl 2-(hydroxyethyl)acrylate; and 2-(hydroxyalkyl)acrylic acids such as 2-(hydroxyethyl)acrylic acid. One or more of these may be used either singly or as combined.

Where the hydroxyl group-containing monomer except the monomer of formula (3) is used, its content in the monomer composition to be polymerized in the polymerization step is preferably from 0 to 30% by mass, more preferably from 0 to 20% by mass, even more preferably from 0 to 15% by mass, still more preferably from 0 to 10% by mass, for sufficiently exhibiting the effect of the invention.

Examples of the unsaturated carboxylic acid include acrylic acid, methacrylic acid, crotonic acid, α-substituted acrylic acids, α-substituted methacrylic acids. One or more of these may be used either singly or as combined. Of those, more preferred are acrylic acid and methacrylic acid as capable of sufficiently exhibiting the effect of the invention.

In the embodiment where unsaturated carboxylic acid is used, its content in the monomer composition to be polymerized in the polymerization step is preferably from 0 to 30% by mass, more preferably from 0 to 20% by mass, even more preferably from 0 to 15% by mass, still more preferably from 0 to 10% by mass, for sufficiently exhibiting the effect of the invention.

Examples of the monomer represented by formula (2) include styrene, vinyltoluene, α-methylstyrene, acrylonitrile, methyl vinyl ketone, ethylene, propylene, vinyl acetate. One or more of these may be used either singly or as combined. Of those, more preferred are styrene and α-methylstyrene as capable of sufficiently exhibiting the effect of the invention.

In the embodiment where the monomer of formula (2) is used, its content in the monomer composition to be polymerized in the polymerization step is preferably from 0 to 30% by mass, more preferably from 0 to 20% by mass, even more preferably from 0 to 15% by mass, still more preferably from 0 to 10% by mass, for sufficiently exhibiting the effect of the invention.

The polymerization temperature and the polymerization time vary depending on the type of the monomers used and the ratio thereof. Preferably, the polymerization temperature is from 0 to 150° C., and the polymerization time is from 0.5 to 20 hours; more preferably, the polymerization temperature is from 80 to 140° C., and the polymerization time is from 1 to 10 hours.

In the polymerization mode using a solvent, the polymerization solvent is not specifically defined. Examples of the solvent include aromatic hydrocarbon solvents such as toluene, xylene, ethylbenzene; ketone solvents such as methyl ethyl ketone, methyl isobutyl ketone; ether solvents such as tetrahydrofuran. One or more of these may be used either singly or as combined. When the boiling point of the solvent used is too high, then the residual volatile fraction remaining in the finally obtained lactone ring-having polymer may increase. Therefore, the boiling point of the solvent is preferably from 50 to 200° C.

In polymerization, a polymerization initiator may be added, if desired. Not specifically defined, examples of the polymerization initiator include organic peroxides such as cumene hydroperoxide, diisopropylbenzene hydroperoxide, di-tert-butyl peroxide, lauroyl peroxide, benzoyl peroxide, tert-butylperoxyisopropyl carbonate, tert-amylperoxy-2-ethyl hexanoate; and azo compounds such as 2,2'-azobis (isobutyronitrile), 1,1'-azobis (cyclohexanecarbonitrile), 2,2'-azobis(2,4-dimethylvaleronitrile). One or more of these may be used either singly or as combined. Not specifically defined, the amount of the polymerization initiator to be used may be suitably determined depending on the combination of the monomers to be used and the reaction condition.

In polymerization, it is desirable that the concentration of the polymer formed in the polymerization reaction mixture is controlled to be at most 50% by mass, for preventing the reaction liquid from gelling. Concretely, in the embodiment where the concentration of the polymer formed in the polymerization reaction mixture is more than 50% by mass, it is desirable that a polymerization solvent is suitably added to the polymerization reaction mixture so as to make the mixture have a polymer concentration of at most 50% by mass. The concentration of the polymer formed in the polymerization reaction mixture is more preferably at most 45% by mass, even more preferably at most 40% by mass. However, when the concentration of the polymer in the polymerization reaction mixture is too low, then the producibility may lower. Therefore, the concentration of the polymer in the polymerization reaction mixture is preferably at least 10% by mass, more preferably at least 20% by mass.

The mode of suitably adding the polymerization solvent to the polymerization reaction mixture is not specifically defined. The polymerization solvent may be continuously added, or may be added intermittently. Thus controlling the concentration of the polymer formed in the polymerization reaction mixture may more sufficiently prevent the reaction liquid from gelling, and in particular, even in a case where the proportion of the hydroxyl group and the ester group in the molecular chain is increased so as to increase the lactone ring content ratio to thereby enhance the heat resistance of the polymer, the gellation may be sufficiently prevented. The polymerization solvent to be added may be the same type as that of the solvent used in the initial stage of monomer feeding for polymerization, or may differ from the latter. Preferably, however, the polymerization solvent to be added is the same type as that of the solvent used in the initial stage of monomer feeding for polymerization. A single solvent or a mixed solvent of two or more different types of solvents may be used as the polymerization solvent to be added.

The polymerization reaction mixture obtained at the time at which the polymerization step as above has ended generally contains a solvent in addition to the formed polymer; however, it is unnecessary to completely remove the solvent to take out the polymer as a solid state, and it is desirable to introduce the polymer still containing the solvent to the subsequent lactone ring-forming condensation step. If desired, however, the polymer is once taken out as a solid state, and a suitable solvent may be newly added to the subsequent lactone ring-forming condensation step.

The polymer obtained in the polymerization step is a polymer (a) having a hydroxyl group and an ester group in the molecular chain, and the weight-average molecular weight of the polymer (a) is preferably from 1,000 to 2,000,000, more preferably from 5,000 to 1,000,000, even more preferably from 10,000 to 500,000, still more preferably from 50,000 to 500,000. The polymer (a) obtained in the polymerization step is heated in the subsequent lactone ring-forming condensation step, in which a lactone ring structure is introduced into the polymer to give a lactone ring-having polymer.

The reaction of introducing a lactone ring structure into the polymer (a) comprises heating the polymer (a) for cyclization and condensation of the hydroxyl group and the ester group existing in the molecular chain of the polymer (a) to give a lactone ring structure, in which the cyclization and condensation gives an alcohol as a side product. The lactone ring structure formed in the molecular chain of the polymer (the main skeleton of the polymer) gives high heat resistance to the resulting polymer. When the reactivity of the cyclization condensation reaction to give the lactone ring structure is poor, then it is undesirable since the heat resistance could not be sufficiently enhanced or the polymer may be condensed during its shaping by the heat treatment in shaping it and the formed alcohol may remain in the shaped article as bubbles or silver streaks.

The lactone ring-having polymer thus obtained in the lactone ring-forming condensation step preferably has the lactone ring structure of the above-mentioned formula (1).

The method of carrying out the thermal treatment of the polymer (a) is not specifically, for which, any known method is usable. For example, the solvent-containing polymerization reaction mixture obtained in the polymerization step may be directly heated as it is. In the presence of a solvent, it may be heated with a ring-closing catalyst. A heating furnace of a reaction device equipped with a vacuum unit or a degassing unit for removing a volatile ingredient, or an extruder equipped with a degassing unit may be used for the thermal treatment.

In the cyclization condensation reaction, other thermoplastic resins may be coexisted with the polymer (a). Also in the cyclization condensation reaction, if desired, an ordinary esterification catalyst or transesterification catalyst such as p-toluenesulfonic acid may be used as a cyclization condensation catalyst; or an organic carboxylic acid such as acetic acid, propionic acid, benzoic acid, acrylic acid or methacrylic acid may be used as a catalyst. As described in JPA Nos. syo 61-254608 and syo 61-261303, a basic compound, an organic carboxylic acid salt and a carbonic acid salt may also be used.

One or more organic phosphor compounds may be used for the cyclization condensation reaction. Examples of the usable organic phosphor compound include alkyl or aryl phosphorous acids, which may change to tautomers thereof, alkyl or aryl phosphinous acids, and mono- or di-esters thereof such as methyl phosphorous acid, ethyl phosphorous acid and phenyl phosphorous acid; dialkyl or diaryl phosphine acids and esters thereof such as dimethyl phosphine acid, diethyl phosphine acid, diphenyl phosphine acid, phenyl methyl phosphine acid, phenyl ethyl phosphine acid; alkyl or aryl phosphonic acids and mono- or di-esters thereof such as methyl phosphonic acid, ethyl phosphonic acid, trifluoro methyl phosphonic acid and phenyl phosphonic acid; alkyl or aryl phosphinous acids and esters thereof such as methyl phosphinous acid, ethyl phosphinous acid, and phenyl phosphinous acid; phosphite mono-, di- or tri-esters such as methyl phosphite, ethyl phosphite, phenyl phosphite, dimethyl phosphite, diethyl phosphite, diphenyl phosphite, trimethyl phosphite, triethyl phosphite and triphenyl phosphite; phosphoric mono-, di- or tri-esters such as methyl phosphate, ethyl phosphate, 2-ethyl hexyl phosphate, octyl phosphate, isodecyl phosphate, lauryl phosphate, stearyl phosphate, isostearyl phosphate, phenyl phosphate, dimethyl phosphate, diethyl phosphate, di-2-ethylhexyl phosphate, di-isodecyl phosphate, di-lauryl phosphate, di-stearyl phosphate, di-isostearyl phosphate, diphenyl phosphate, trimethyl phosphate, triethyl phosphate, tri-isodecyl phosphate, tri-lauryl phosphate, tri-stearyl phosphate, tri-isostearyl phosphate and tri-phenyl phosphate; mono-, di- or tri-alkyl or aryl phosphines such as methyl phosphine, ethyl phosphine, phenyl phosphine, phenyl phosphine, dimethyl phosphine, diethyl phosphine, diphenyl phosphine, trimethyl phosphine, triethyl phosphine and triphenyl phosphine; alkyl or aryl halide phosphine such as methyl dichloro phosphine, ethyl dichloro phosphine, phenyl dichloro phosphine, dimethyl chloro phosphine, diethyl chloro phosphine and diphenyl chloro phosphine; mono-, di- or tri-alkyl or aryl oxide phosphines such as methyl oxide phosphine, ethyl oxide phosphine, phenyl oxide phosphine, dimethyl oxide phosphine, diethyl oxide phosphine, diphenyl oxide phosphine, trimethyl oxide phosphine, triethyl oxide phosphine, and triphenyl oxide phosphine; and tetra alkyl or aryl phosphonium chlorides such as tetra-methyl phosphorous chloride, tetra-ethyl phosphorous chloride and tetra-phenyl phosphorous chloride. One or more type of organic phosphorous compounds may be sued. Among these compounds, in terms of high catalyst-activity and low-coloration, preferred are alkyl or aryl phosphorous acids, phosphite mono- or di-esters, phosphoric mono- or di-esters, and alkyl or aryl phosphonic acids; more preferred are alkyl or aryl phosphorous acids, phosphite mono- or di-esters, and phosphoric mono- or di-esters; and even more preferred are alkyl or aryl phosphorous acids and phosphite mono- or di-esters.

The amount of the catalyst to be added is not also specifically defined. Preferably, it may be from 0.001 to 5% by mass of the polymer (a), more preferably from 0.01 to 2.5% by mass, even more preferably from 0.01 to 1% by mass, still more preferably from 0.05 to 0.5% by mass. When the amount of the catalyst is less than 0.001% by mass, the ratio of the cyclization condensation reaction may be accelerated sufficiently. On the other hand, when the amount of the catalyst is more than 5% by mass, the obtained polymer may be colored or cross-linked, and the crosslinked polymer may be not suitable for melt-film processing.

The catalyst may be added in the initial stage of reaction, or during the reaction, or both in the two.

Preferably, the cyclization condensation reaction is carried out in the presence of a solvent, and the cyclization condensation is combined with a degassing step. The cyclization condensation may be combined with a degassing step all the time during the reaction, and the cyclization condensation may not be combined with a degassing step all the time during the reaction but may be combined with it in a part of the reaction. In these embodiments, the alcohol formed as a side product during the cyclization condensation may be forcedly degassed, and therefore, the reaction equilibrium is advantageous for the product side.

The degassing step comprises removing the volatile fractions such as solvent and unreacted monomer, and the alcohol formed as a side product by the cyclization condensation for lactone ring structure formation, optionally under reduced pressure and under heat. When the removal is insufficient, then the amount of the remaining volatile fractions in the formed resin may increase, therefore causing various problems in that the shaped product of the resin may be colored owing to the discoloration of the volatile fractions during shaping or the shaped product may have shaping failures such as bubbles and silver streaks.

In the embodiment where the cyclization condensation is combined with a degassing step all the time during the reaction, the apparatus to be used is not specifically defined. Preferably used in the embodiment is a degassing unit comprising a heat exchanger and a degassing tank, or a vented extruder, or a combination of the degassing unit and the vented extruder connected in series. More preferred is a degassing unit comprising a heat exchanger and a degassing tank, or a vented extruder.

The reaction temperature in the embodiment where the above-mentioned degassing unit comprising a heat exchanger and a degassing tank is used is preferably within a range of from 150 to 350° C., more preferably from 200 to 300° C. When the reaction temperature is not lower than 150° C., then the cyclization condensation may go on sufficiently and the remaining volatile fractions may be reduced; and when it is not higher than 350° C., then the polymer may be prevented from being colored or decomposed.

The reaction pressure in the embodiment where the above-mentioned degassing unit comprising a heat exchanger and a degassing tank is used is preferably within a range of from 931 to 1.33 hPa (700 to 1 mmHg), more preferably from 798 to 66.5 hPa (600 to 50 mmHg). When the pressure is at most 931 hPa, then the volatile fractions including alcohol may be sufficiently prevented from remaining in the system; and when it is at least 1.33 hPa, the industrial performance of the method may be better.

When the above-mentioned vented extruder is used, the number of the vents may be one or more. Preferably, the extruder has plural vents.

In the embodiment where the vented extruder is used, the reaction temperature is preferably within a range of from 150 to 350° C., more preferably from 200 to 300° C. When the temperature is not lower than 150° C., the cyclization condensation may go on sufficiently and the remaining volatile fractions may be reduced; and when it is not higher than 350° C., then the polymer may be prevented from being colored or decomposed.

The reaction pressure in the embodiment where the above-mentioned vented extruder is used is preferably within a range of from 931 to 1.33 hPa (700 to 1 mmHg), more preferably from 798 to 13.3 hPa (600 to 10 mmHg). When the pressure is at most 931 hPa, then the volatile fractions including alcohol may be sufficiently prevented from remaining in the system; and when it is at least 1.33 hPa, the industrial performance of the method may be better.

In the embodiment where the cyclization condensation is combined with a degassing step all the time during the reaction, the physical properties of the obtained lactone ring-having polymer may worsen under a severe heat treatment condition as described hereinunder; and therefore in the embodiment, it is desirable that the above-mentioned alcohol removal catalyst is used and the reaction is attained by the use of a vented extruder under a condition as mild as possible.

In the embodiment where the cyclization condensation is combined with a degassing step all the time during the reaction, it is desirable that the polymer (a) formed in the polymerization step is introduced into the cyclization condensation reactor system along with a solvent thereinto, but in this embodiment, if desired, the polymer may be once again led to pass through the above-mentioned reactor device such as a vented extruder.

In another embodiment, the cyclization condensation may be not combined with a degassing step all the time during the reaction but is combined with it in a part of the reaction. For example, the device in which the polymer (a) has been produced is further heated, and if desired, this is combined with a degassing step in which the cyclization condensation of the polymer is partly attained in some degree, and then the polymer is processed in the subsequent cyclization condensation step combined with a degassing step, in which the reaction of the polymer is thus completed.

In the above-mentioned embodiment where the cyclization condensation is combined with a degassing step all the time during the reaction, for example, the polymer (a) may be partly decomposed before the cyclization condensation owing to the difference in the heat history thereof in the high-temperature heat treatment at around 250° C. or higher in a double-screw extruder, and the physical properties of the obtained lactone ring-having polymer may be thereby worsened. To solve the problem, prior to the cyclization condensation combined with the degassing step, the polymer is previously processed for cyclization condensation in some degree; and in that manner, the reaction condition in the latter step of subsequent cyclization condensation of the polymer may be relaxed in some degree and the physical properties of the obtained lactone ring-having polymer may be prevented from being worsened. Accordingly, this embodiment is preferred. More preferably, the degassing step is started after a period of time from the start of the cyclization condensation, or that is, the polymer (a) produced in the polymerization step is processed for cyclization condensation of the hydroxyl group and the ester group existing in the molecular chain thereof so that the cyclization condensation degree of the polymer is increased in some degree, and then the polymer is again processed for cyclization condensation as combined with a degassing step. Concretely, for example, the polymer is processed in a pot-type reactor in the presence of a solvent therein for cyclization condensation in some degree, and then, this is transferred into a reactor equipped with a degassing unit, for example, into a degassing system comprising a heat exchanger and a degassing tank, or a vented extruder, in which the cyclization condensation of the polymer is completed. This is an example of the preferred embodiment. Especially in this embodiment, it is more desirable that a catalyst for cyclization condensation exists in the reaction system.

As described in the above, the method of cyclization condensation simultaneously combined with a degassing step, in which the hydroxyl group and the ester group existing in the molecular chain of the polymer (a) obtained in the polymerization step are previously processed for cyclization condensation to increase the cyclization condensation degree of the polymer in some degree, is a preferred embodiment for obtaining the lactone ring-having polymer for use in the invention. According to this embodiment, a lactone ring-having polymer having a higher glass transition temperature, having a higher degree of cyclization condensation and having more excellent heat resistance can be obtained. In this embodiment, regarding the intended degree of cyclization condensation, it is desirable that the mass reduction ratio in the range falling between 150° C. and 300° C. in the dynamic TG determination shown in Examples given hereinunder is at most 2%, more preferably at most 1.5%, even more preferably at most 1%.

The reactor employable for the previous cyclization condensation to be attained prior to the cyclization condensation simultaneously combined with a degassing step is not specifically defined. Preferably, the reactor is an autoclave, a pot-type reactor, or a degassing unit comprising a heat exchanger and a degassing tank. In addition, a vented extruder favorable for the cyclization condensation simultaneously combined with a degassing step is also favorably used. More preferred is an autoclave or a pot-type reactor. However, even when any other reactor such as a vented extruder is used, the cyclization condensation may be attained under the same reaction condition as that in an autoclave or a pot-type reactor, by controlling the venting condition to a more moderate one, or by not venting the extruder, or by controlling the temperature condition, the barrel condition, the screw form and the screw driving condition.

For the previous cyclization condensation to be attained prior to the cyclization condensation simultaneously combined with a degassing step, preferably employed is (i) a method of adding a catalyst to a mixture that contains the polymer (a) formed in the polymerization step and a solvent, and heating it, or (ii) a method of heating the mixture in the absence of a catalyst. The method (i) and (ii) may be attained under pressure.

The "mixture containing the polymer (a) and a solvent" to be introduced into the cyclization condensation system in the lactone ring-forming step may be the polymerization reaction mixture obtained in the polymerization step as it is; or the solvent may be once removed from the mixture, and a different solvent suitable for cyclization condensation may be newly added to it.

The solvent that may be added to the previous cyclization condensation to be attained prior to the cyclization condensation simultaneously combined with a degassing step is not specifically defined. For example, the solvent includes aromatic hydrocarbons such as toluene, xylene, ethylbenzene; ketones such as methyl ethyl ketone, methyl isobutyl ketone; and chloroform, DMSO, tetrahydrofuran. Preferably, the solvent is the same as that usable in the polymerization step.

The catalyst to be added in the above step (i) may be ordinary esterification or interesterification catalysts such as p-toluenesulfonic acid, as well as basic compounds, organic carboxylic acid salts, carbonic acid salts. Preferred are the above-mentioned organic phosphorus compounds. The time when the catalyst is added is not specifically defined. The catalyst may e added in the initial stage of reaction, or during the reaction, or both in the two. The amount of the catalyst to be added is not also specifically defined. Preferably, it may be from 0.001 to 5% by mass of the polymer (a), more preferably from 0.01 to 2.5% by mass, even more preferably from 0.01 to 1% by mass, still more preferably from 0.05 to 0.5% by mass. The heating temperature and the heating time in the step (i) are not specifically defined. The heating temperature is preferably not lower than room temperature, more preferably not lower than 50° C.; and the heating time is preferably from 1 to 20 hours, more preferably from 2 to 10 hours. When the heating temperature is low, or when the heating time is short, then it is unfavorable since the conversion in cyclization condensation may lower. However, when the heating time is too long, then it is also unfavorable since the resin may color or decompose.

For the above method (ii), for example, employable is a method of heating the polymerization mixture obtained in the polymerization step, directly as it is, using a pressure-resistant pot reactor. The heating temperature is preferably not lower than 100° C., more preferably not lower than 150° C. The heating time is preferably from 1 to 20 hours, more preferably from 2 to 10 hours. When the heating temperature is low, or when the heating time is short, then it is unfavorable since the conversion in cyclization condensation may lower. However, when the heating time is too long, then it is also unfavorable since the resin may color or decompose.

The above methods (i) and (ii) may be attained under pressure with no problem, depending on the condition thereof.

During the previous cyclization condensation to be attained prior to the cyclization condensation simultaneously combined with a degassing step, a part of the solvent may spontaneously vaporize during the reaction with no problem.

At the end of the previous cyclization condensation to be attained prior to the cyclization condensation simultaneously combined with a degassing step, or that is, just before the start of the degassing step, the mass reduction ratio in the range falling between 150° C. and 300° C. in dynamic TG determination is preferably at most 2%, more preferably at most 1.5%, even more preferably at most 1%. When the mass reduction ratio is at most 2%, then the cyclization condensation reactivity may be increased up to a sufficiently high level during the successive cyclization condensation simultaneously combined with a degassing step, and the obtained lactone ring-having polymer may therefore have better physical properties. During the cyclization condensation, any other thermoplastic resin may be added to the system in addition to the polymer (a).

In the embodiment where the hydroxyl group and the ester group existing in the molecular chain of the polymer (a) obtained in the polymerization step are previously cyclized and condensed so as to increase the conversion in cyclization condensation reaction in some degree and where the previous cyclization condensation is followed by the successive cyclization condensation simultaneously combined with a degassing step, the polymer obtained in the previous cyclization condensation step (in the polymer, the hydroxyl group and the ester group existing in the molecular chain are at least partly cyclized and condensed) and a solvent may be introduced into the subsequent process of cyclization condensation simultaneously combined with a degassing step directly as such; or if desired, the polymer (in the polymer, the hydroxyl group and the ester group existing in the molecular chain are at least partly cyclized and condensed) may be isolated and a solvent may be newly added thereto or the polymer may be processed for any other treatment, and thereafter it may be introduced into the subsequent cyclization condensation step simultaneously combined with a degassing step.

The degassing step is not always completed simultaneously with the cyclization condensation, but it may be completed after a while from the end of the cyclization condensation.

The lactone ring-having polymer has a weight-average molecular weight of preferably from 1,000 to 2,000,000, more preferably from 5,000 to 1,000,000, even more preferably from 10,000 to 500,000, still more preferably from 50,000 to 500,000.

Preferably, the mass reduction ratio of the lactone ring-having polymer, as measured within a range of from 150 to 300° C. through dynamic TG analysis, is at most 1%, more preferably at most 0.5%, even more preferably at most 0.3%.

As having a high conversion in cyclization condensation, the lactone ring-having polymer is free from the drawbacks of bubbles or silver streaks to be in the shaped articles thereof. Further, owing to the high conversion in cyclization condensation thereof, the lactone ring structure may be sufficiently introduced into the polymer, and therefore, the obtained lactone ring-having polymer may have sufficiently high heat resistance.

Preferably, the degree of coloration (YI) of the lactone ring-having polymer, as measured in a 15% mass chloroform solution, is at most 6, more preferably at most 3, even more preferably at most 2, most preferably at most 1. When the degree of coloration (YI) is not higher than 6, then the polymer may be prevented from coloring and may have high transparency.

Preferably, the temperature for 5% mass reduction in thermal mass analysis (TG) of the lactone ring-having polymer is not lower than 330° C., more preferably not lower than 350°

C., even more preferably not lower than 360° C. The temperature for 5% mass reduction in thermal mass analysis (TG) is an index of thermal stability. When the temperature is not lower than 330° C., then the polymer may exhibit sufficient thermal stability.

Preferably, the lactone ring-having polymer has a glass transition temperature (Tg) of not lower than 115° C., more preferably not lower than 125° C., even more preferably not lower than 130° C., still more preferably not lower than 135° C., most preferably not lower than 140° C.

Preferably, the total amount of the volatile residues in the lactone ring-having polymer is at most 1,500 ppm, more preferably at most 1,000 ppm. When the total amount of the volatile residues is at most 1,500 ppm, then the polymer may be effectively prevented from having shaping failures of coloration, bubbles or silver streaks to be caused by the deterioration of the polymer in shaping it.

Preferably, the whole light transmittance of the injection-molded article of the lactone ring-having polymer, as measured according to the method of ASTM-D-1003, is at least 85%, more preferably at least 88%, even more preferably at least 90%. The whole light transmittance is an index of transparency.

The thermoplastic-resin film to be used in the invention comprises the lactone ring-having polymer as a major ingredient, and, more specifically, the amount of lactone ring-having polymer in the film is preferably from 50 to 100% by mass, more preferably from 60 to 100% by mass, even more preferably from 70 to 100% by mass, and even much more preferably from 80 to 100% by mass. When the amount of the lactone ring-having polymer is less than 50% by mass, the effect of the invention may be insufficient.

The thermoplastic-resin film may further comprise one or more polymers other than the lactone ring-having polymer, examples of such other polymer(s) include olefin-polymers such as polyethylenes, polypropylenes, ethylene-propylene copolymers and poly(4-methyl-1-pentene); vinyl halide-type polymers such as poly vinyl chloride, poly vinylidene chloride and polyvinyl chloride resin; acryl-type polymers such as polymethyl methacrylates; polystyrenes, styrene-methyl methacrylate copolymers, styrene-acrylonitrile copolymers, acrylonitrile-butadiene-styrene block copolymers; polyesters such as polyethylene terephthalates, polybutylene terephthalates and polyethylene naphthalates; polyamides such as nylon 6, nylon 66 and nylon 610; polyacetals; polycarbonates; polyphenylene oxides; polyphenylene sulfides, polyether ketones; polysulfones; polyethersulfones; polyoxy benzyls; polyamide imides; and gum polymers such as ABS and ASA resins containing polybutadiene-type rubber or acryl-type rubber.

The amount of the other polymer(s) in the thermoplastic-resin film is preferably from 0 to 50% by mass, more preferably from 0 to 40% by mass, even more preferably from 0 to 30% by mass and even much more preferably from 0 to 20% by mass.

Various additives may be added to the thermoplastic-resin film. The additives include, for example, hindered phenol-based, phosphorus-containing or sulfur-containing antioxidants; stabilizers such as light-resistant stabilizers, weather-resistant stabilizers and thermal stabilizers; reinforcing materials such as glass fibers and carbon fibers; UV absorbents such as phenyl salicylate, (2,2'-hydroxy-5-methylphenyl)benzotriazole and 2-hydroxybenzophenone; near-IR absorbents; flame retardants such as tris (dibromopropyl) phosphate, triallyl phosphate and antimony oxide; antistatic agents such as anionic, cationic or nonionic surfactants; colorants such as inorganic pigments, organic pigments and dyes; organic fillers and inorganic fillers; resin modifiers, plasticizers; lubricants, etc.

The content of the additives in the thermoplastic-resin film is preferably from 0 to 5% by mass, more preferably from 0 to 2% by mass, even more preferably from 0 to 0.5% by mass.

The method for producing the thermoplastic-resin film is not specifically defined. For example, a lactone ring-having polymer and other polymer and additive may be fully mixed in an ordinary known method to prepare a thermoplastic-resin composition, and this may be formed into a film. Alternatively, a lactone ring-having polymer and other polymer and additive may be separately prepared in different containers, and they may be mixed to give a uniform mixture, which may be then formed into a film.

First, for producing a thermoplastic-resin composition, for example, the above-mentioned film materials are pre-blended with an ordinary known mixer such as an omni-mixer, and the resulting mixture is kneaded by extrusion. In this case, the mixer to be used for extrusion kneading is not specifically defined, and usable are ordinary known mixers, for example, extruders such as a single-screw extruder and a twin-screw extruder, as well as pressure kneaders.

For film formation, for example, employable are conventional known film formation methods such as a solution-casting method, a melt extrusion method, a calendering method, a compression forming method, etc. Of those film formation methods, preferred is a solution-casting method and a melt extrusion method.

Examples of the solvent to be used in the solution casting method include aromatic solvents such as benzene, toluene and xylene; aliphatic hydrocarbons such as cyclohexane and decalin; esters such as ethyl acetate and butyl acetate; ketones such as acetone, methyl ethyl ketone and methyl isobutyl ketone; alcohols such as methanol, ethanol, isopropanol, butanol, isobutanol, methyl cellosolve, ethyl cellosolve and butyl cellosolve; ethers such as tetrahydrofuran and dioxane; halogenated hydrocarbons such as dichloromethane, chloroform and carbon tetrachloride; dimethylformamide; and dimethylsulfoxide. One or more selected from these solvents may be used either singly or as combined.

Examples of the apparatus for the solution casting method include a drum casting machine, a band casting machine, and a spin coater.

The melt extrusion method may be carried out according to a T-die method or an inflation method, in which the film-forming temperature is preferably from 150 to 350° C., more preferably from 200 to 300° C.

According to the melt extrusion method employing a T-die, a T-die is attached to a known single screw extruder or twin screw extruder at the terminal portion thereof, and a film extruded is rolled up, and then a rolled-up film is obtained. The temperature of the wind-up roll may be controlled to stretch the film along the extrusion direction, or in other words, to stretch the film monoaxially. The film may be stretched along the direction orthogonal to the extrusion direction, or in other words the film may be subjected to a successive biaxial stretching or simultaneous biaxial stretching treatment.

The thermoplastic-resin film may be a stretched or non-stretched film; and the thermoplastic-resin film may be a successively biaxially-stretched or simultaneous biaxially-stretched film. By carrying out a biaxially-stretching treatment, the mechanical strength of the film may be improved, and the film properties may be improved. By adding other thermoplastic resin(s) to the thermoplastic-resin film containing a lactone-ring-having polymer as a major ingredient, it may be possible to prevent the enhancement of retardation of film to be subjected to a stretching treatment and to obtain an optically isotropic film even if it is subjected to a stretching treatment.

Preferably, the stretching is effected at around the glass transition temperature of the polymer used as the film material. Concretely, the stretching temperature is preferably from (glass transition temperature−30° C.) to (glass transition temperature+100° C.), more preferably from (glass transition temperature−20° C.) to (glass transition temperature+80° C.). When the stretching temperature is not lower than the (glass transition temperature−30° C.), then the film may be stretched at a sufficient draw ratio; and when the stretching temperature is not higher than the (glass transition temperature+100° C.), then the resin may well flow enough for stable stretching.

The draw ratio in stretching by area is preferably from 1.1 to 25 times, more preferably from 1.3 to 10 times. When the draw ratio is at least 1.1 times, then the toughness of the stretched film may be increased; and on the contrary, when the draw ratio is at most 25 times, then the effect of stretching may increase in accordance with the increased draw ratio.

The stretching rate (in one direction) is preferably from 10 to 20,000%/min, more preferably from 100 to 10,000%/min. When the stretching rate is at least 10%/min, then the time for obtaining the sufficient draw ratio may be shortened and the production cost may be thereby reduced. On the contrary, when the stretching rate is at most 20,000%/min, then the film being stretched is prevented from being cut.

For stabilizing the optical isotropy and the mechanical properties thereof, the stretched film may be subjected to a thermal treatment such as an anneal treatment. The thermal treatment may be carried out under the general condition which has been used in the thermal treatments for the conventional stretched films.

The thickness of the polymer film for use as the support in the second invention is preferably from 5 μm to 200 μm, more preferably from 10 μm to 100 μm. When the thickness is less than 5 μm, then the strength of the film may become worse and the film may curl up remarkably when being subjected to a durability test; but when the thickness is more than 200 μm, then the transparency of the film may become worse and the moisture permeability of the film may become so low that the drying ratio of water contained in the water-type adhesion.

The thermoplastic-resin film preferably has a surface wet tension of at least 40 mN/m, more preferably at least 50 mN/m, even more preferably at least 55 mN/m. When the surface wet tension is at least 40 mN/m, then the adhesion strength between the thermoplastic-resin film and any other layer, for example, a polarizing element or the like may be further enhanced. For controlling the surface wet tension thereof, for example, the film may be processed for conventional known surface treatment such as corona discharge treatment, plasma treatment, ozone blasting, UV radiation, flame treatment or chemical treatment.

The thermoplastic-resin film may contain various additives. For example, a retardation controlling agent for reducing retardation in plane and/or retardation along the thickness direction of the film may be added to the film. Adding such a retardation controlling agent to the film and optionally stretching the film may make the film have desired optical characteristics.

(Adhesive Layer)

In the invention, preferably, an adhesive layer is formed on the surface of the thermoplastic-resin film for enhancing the adhesiveness of the thermoplastic-resin film to a polarizing element. Preferably, the adhesive layer is formed of a polyurethane resin composition (including a composition that contains a polyurethane resin and/or a precursor capable of giving a polyurethane after reaction) and/or a composition containing an amino group-having polymer (hereinafter these may be referred to as "adhesive layer-coating composition"). The composition is prepared as a coating liquid, and this is applied onto at least one surface of the thermoplastic-resin film and dried/cured or dried to form the intended adhesive layer.

The thickness of the adhesive layer is preferably from 0.01 to 10 μm or so, more preferably from 0.05 to 3 μm or so, even more preferably from 0.1 to 1 μm or so. When the thickness of the adhesive layer falls within the range, it is favorable since the adhesiveness thereof may be sufficient and, in addition, in a water resistance or moisture resistance test, the polarizer may be hardly decolored or discolored.

The composition containing a polyurethane resin or containing a precursor capable of giving a polyurethane resin after reaction, and the amino group-having polymer for use in forming the adhesive layer, and the method for forming the adhesive layer are described in JPA No. 2007-127893, paragraphs [0124] to [0175], and the description may be referred to for the material of the adhesive layer and the method for forming the layer in the invention.

For controlling the surface wet tension, the surface of the thermoplastic-resin film or the surface of the adhesive layer to be formed optionally may be processed for conventional known surface treatment such as corona discharge treatment, plasma treatment, ozone blasting, UV radiation, flame treatment or chemical treatment.

(Polarizing Element)

The polarizing element of the polarizing plate for use in the invention may be any of an iodine-containing polarizing film, a dichroic dye-containing polarizing film or a polyene-based polarizing film. The iodine-based polarizing film and the dye-containing polarizing film may be produced generally by the use of a polyvinyl alcohol film.

(Second Protective Film)

Preferably, the polarizing plate for use in the invention has a second protective film in addition to the thermoplastic-resin film. The second protective film is stuck to the surface of a polarizing element opposite to the surface thereof to which the thermoplastic-resin film is not stuck. The second protective film may be formed of the same film as that of the thermoplastic-resin film or may be any other polymer film, or a cellulose acylate film, a polycarbonate film, a norbornene-based film or the like.

(Adhesive)

In fabricating the polarizing plate for use in the invention, an adhesive may be used in sticking the thermoplastic-resin film or the second protective film to the polarizing element. More preferably, the above-mentioned adhesive layer is formed on the surface of the thermoplastic-resin film, then the adhesive layer is stuck to the other layer with an adhesive. Examples of the usable adhesive include a PVA adhesive, a polyurethane adhesive, an acrylic adhesive and an isocyanate adhesive. One or more of these adhesives may be used herein either singly or as combined. Of those adhesives, especially preferred are a polyurethane adhesive and an isocyanate adhesive. The morphology of the adhesive is not specifically defined. For example, various types of adhesives such as solvent-based adhesives, water-based adhesives and non-solvent adhesives may be used.

Polyurethane adhesives, isocyanate adhesives, and reaction catalysts and additives to be used for them as well as their amount are described in detail in JPA No. 2007-12789, paragraphs [0174] to [0194], and the description may be referred to for the adhesives usable in the invention.

(Other Functional Layers)

The polarizing plate for use in the invention may have various functional layers, for example, a non-glare layer, a contamination-preventing layer such as a photocatalyst layer, a hard coat layer, an antireflection layer, a UV-blocking layer, a heat ray-blocking layer, an electromagnetic wave-blocking layer, a gas-barrier layer, etc. The materials and others for use in forming them are described in detail in JPA No. 2006-96960, paragraphs [0060] to [0065], and the description may be referred to for the materials for forming various functional layers in the invention.

(Another Polarizing Plate)

The polarizing plate usable along with the polarizing plate having the thermoplastic-resin film is not specifically defined. A polarizing plate similarly having the thermoplastic-resin film may be used, or a polarizing plate having a protective film only of any other polymer film, for example, a cellulose acylate film, a polycarbonate film or a norbornene-based film may be used. Preferably used are two polarizing plates both having the thermoplastic-resin film, as enhancing the effect of the invention. In the embodiments where one polarizing plate alone having the thermoplastic-resin film is used, it is preferably disposed as the polarizing plate on the back side (PLb in FIG. 1).

The liquid-crystal display device of the invention is not limited to the constitution shown in FIG. 1, and may have any other member. For example, a color filter may be disposed between the liquid-crystal cell and the polarizing film. As will be described hereinunder, any other optical compensatory film may be disposed between the liquid-crystal cell and the polarizing plate. In the embodiments where the device is a transmission-type device, a cold cathode or hot cathode fluorescent tube, or a light source with a light-emitting diode, a filed emission element or an electroluminescent element may be disposed on the back. The liquid-crystal display device of the invention may be a reflection-type device. In such a case, only one polarizing plate of the invention may be disposed on the viewers' side, and a reflection film is disposed on the back side of the liquid-crystal cell or on the inner surface of the lower substrate of the liquid-crystal cell. Needless-to-say, a front light with the above-mentioned light source may be disposed on the viewers' side of the liquid-crystal cell.

The liquid-crystal display device of the invention includes a forward-looking type device, an image projection type device and a photomodulation type device. The invention is especially effectively applied to active matrix liquid-crystal display devices comprising a 3-terminal or 2-terminal semiconductor element such as TFT or MIM. Needless-to-say, the invention is also effectively applicable to passive matrix liquid-crystal display devices such as typically STN-type devices referred to as time-sharing driving devices.

EXAMPLES

The invention is described more concretely with reference to the following Examples, in which the material and the reagent used, their amount and the ratio, the details of the treatment and the treatment process may be suitably modified or changed not overstepping the spirit and the scope of the invention. Accordingly, the invention should not be limited by the Examples mentioned below.

[Construction of IPS-Mode Liquid-Crystal Cell]

On one glass substrate, electrodes were disposed so that the distance between the adjacent electrodes could be 20 μm, and a polyimide film serving as an alignment film was disposed on it, and this was rubbed. A polyimide film was disposed on one surface of another glass substrate prepared separately, and rubbed to be an alignment film. The two glass substrates were put one upon another in such a manner that their alignment films could face each other and their distance (gap; d) could be 3.9 μm, and stuck together with the rubbing directions of the two glass substrate kept in parallel to each other; and then a nematic liquid-crystal composition having a refractivity anisotropy (Δn) of 0.0769 and having a positive dielectric anisotropy (Δ∈) of 4.5 was sealed up between the two substrates. The liquid-crystal layer had d·Δn of 300 nm.

[Fabrication of Polarizing Plates PL1 to PL6]

(Preparation of Thermoplastic-Resin Film F1)

With reference to Production Examples described in "Examples" in JPA No. 2006-96960, a thermoplastic-resin film F1 was produced. Concretely, the film was produced according to the method mentioned below.

9000 g of methyl methacrylate (MMA), 1000 g of methyl 2-(hydroxymethyl)acrylate (MHMA), 10000 g of 4-methyl-2-pentanone (methyl isobutyl ketone, MIBK) and 5 g of n-dodecylmercaptan were fed into a 30-liter reactor equipped with a stirrer, a temperature sensor, a condenser tube and a nitrogen-introducing duct, and with introducing nitrogen thereinto, this was heated up to 105° C., and when this became refluxed, 5.0 g of a polymerization initiator, tertiary butyl-peroxyisopropyl carbonate (Akzo Chemical's trade name, Kayacarbon Bic-7) was added thereto and simultaneously with dropwise adding a solution comprising 100 g of tertiary butyl-peroxyisopropyl carbonate and 230 g of MIBK thereto, taking 4 hours, this was subjected to solution polymerization under reflux (at about 105 to 120° C.), and further ripened for 4 hours.

30 g of stearyl phosphate/distearyl phosphate mixture (Sakai Chemical's trade name, Phoslex A-18) was added to the obtained polymer solution, and this was subjected to ring-closing condensation under reflux (at about 90 to 120° C.) for 5 hours. Next, the polymer solution obtained as a result of the above ring-closing condensation was introduced into a vented twin-screw extruder (φ=29.75 mm, L/D=30) having a barrel temperature of 260° C., running at a revolution of 100 rpm and under a reduced pressure of from 13.3 to 400 hPa (10 to 300 mmHg), and having one rear vent and 4 fore vents at a feeding rate of 2.0 kg/hr in terms of the resin amount, and in the extruder, this was further subjected to ring-closing condensation with degassing, and extruded out to give transparent pellets (1A).

The obtained pellets (1A) were analyzed for various physical properties thereof according to the method described in JPA No. 2006-96960, and these were identified as the pellets 1A produced according to Examples in JPA No. 2006-96960.

Using a 20 mmφ twin-screw extruder, the pellets (1A) obtained in Production Example 1 were melt-extruded through the coat hunger-type T-die thereof having a width of 150 mm, thereby producing a film F1 having a thickness of about 100 μm. The film F1 was as follows:

Re(630)=0.6 nm,
Rth(630)=−1.7 nm,
|Re(400)−Re(700)|=0.1 nm, and
|Rth(400)−Rth(700)|=1.0 nm;

and the film satisfied the above formulae (I) and (II). In addition, the film F1 was as follows:

|Re{50}−Re{2}|=1 nm,
|Rth{50}−Rth{25}|=2 nm,
|Re[80]−Re[10]|=0 nm, and
|Rth[80]−Rth[10]|=0.5 nm;

and the film satisfied all the above formulae (III) to (VI).

(Preparation of ZRF Film F2)

A commercially-available cellulose acetate film (ZRF80s, by FUJIFILM—hereinafter this is referred to as "ZRF film") was used as a polymer film F2. The film F2 was as follows:

Re(630)=1 nm,
Rth(630)=−7 nm,
|Re (400)−Re(700)|=2 nm, and
|Rth(400)−Rth(700)|=15 nm;

and the film was as follows:
|Re{50}−Re{25}|=3 nm,
|Rth{50}−Rth{25}|=10 nm,
|Re[80]−Re[10]|=0.3 nm, and
|Rth[80]−Rth[10]|=16 nm.
(Preparation of TAC Film F3)

A commercially-available cellulose acetate film (Fujitac TD80UF, by FUJIFILM—hereinafter this is referred to as "TAC film") was used as a polymer film F3. The film F3 was as follows:
Re(630)=1 nm,
Rth(630)=38 nm,
|Re(400)−Re(700)|=0.8 nm, and
|Rth(400)−Rth(700)|=20 nm;
(Polarizing Film)

A stretched polyvinyl alcohol film was processed to adsorb iodine, and this was used a polarizing film.
(Fabrication of Polarizing Plate PL1)

An isocyanate-based adhesive was applied to the surface of Thermoplastic-resin film F1, and a PVA-based adhesive was applied to the surface of the TAC film F3; and the polarizing film was sandwiched between these films and laminated in a mode of wet lamination with extruding out the superfluous adhesive with a pressure roller. Next, this was heated and dried to produce a polarizing plate.
(Fabrication of Polarizing Plate PL2)

A PVA-based adhesive was applied to the surface of the ZRF film F2, and a PVA-based adhesive was applied to the surface of the TAC film F3; and the polarizing film was sandwiched between these films and formed into a polarizing plate in the same manner as above.
(Fabrication of Polarizing Plate PL3)

A PVA-based adhesive was applied to the surfaces of the two TAC films F3; and the polarizing film was sandwiched between these films and formed into a polarizing plate in the same manner as above.
[Construction of IPS-Mode Liquid-Crystal Display Device]

A liquid-crystal display device having the same constitution as in FIG. 1 was constructed. Concretely, this was constructed according to the method mentioned below.

A panel-side polarizing plate PLa and a back-side polarizing plate PLb were stuck to the surface and the back of the IPS-mode liquid-crystal cell produced in the above, as in FIG. 1 showing various combinations of polarizing plates, thereby constructing liquid-crystal display devices LCD1 to LCD6. The polarizing plates PL1 and PL2 were so disposed that the liquid-crystal cell-side protective film thereof could be Thermoplastic-resin film F1 or ZRF film.

[Evaluation]

Thus constructed, the liquid-crystal display devices LCD1 to LCD6 were evaluated as follows:

The liquid-crystal display devices were left at a temperature of 25° C. and a humidity of 60% for 1 hour, and then at a temperature of 80° C. and a humidity of 10% for 1 hour; and they were tested and evaluated for the degree of color shift seen in oblique directions in the black state and for the black brightness at the front (in the normal line direction). The evaluation standards are shown below. The results are given in Table 1.
Color Shift:
  AA: Perfectly no color shift.
  A: No color shift.
  B: Some color shift was seen but on the acceptable level.
  C: Color shift was seen.
Front Black Brightness:
  AA: Perfectly no light leakage in the front, and no CR reduction.
  A: No light leakage in the front, and no CR reduction.
  B: Some light leakage, but little CR reduction.
  C: Noticeable light leakage in the front with CR reduction.

TABLE 1

| LCD | Polarizing Plate at Displaying Side PLa | Polarizing Plate at Backlight Side PLb | Evaluation Color Shift | Evaluation Front Black Brightness |
|---|---|---|---|---|
| LCD1 | PL1 | PL1 | AA | AA |
| LCD2 | PL2 | PL1 | AA | A |
| LCD3 | PL3 | PL1 | AA | B |
| LCD4 | PL1 | PL2 | B | A |
| LCD5 | PL2 | PL2 | B | B |
| LCD6 | PL3 | PL3 | C | C |

Using a 20 mmφ twin-screw extruder, the pellets (1A) were melt-extruded through the coat hunger-type T-die having a width of 150 mm, with changing the thickness in melt extrusion, the temperature, the humidity and the stretching condition, thereby producing Thermoplastic-resin films F10 to F34 having the optical characteristics shown in the following Table.

Using triacetyl cellulose in a known casting method, comparative Triacetyl cellulose films F50 to F53 having the optical characteristics shown in the following Table were produced with changing the thickness, the temperature, the humidity and the stretching condition thereof.

TABLE 2

| Film No. | Retardation Re(630) (nm) | Retardation Rth(630) (nm) | ΔRe*1 (nm) | ΔRth*2 (nm) | Variation in Retardation depending on Temperature Re*3 (nm) | Variation in Retardation depending on Temperature Rth*4 (nm) | Variation in Retardation depending on Humidity Re*5 (nm) | Variation in Retardation depending on Humidity Rth*6 (nm) |
|---|---|---|---|---|---|---|---|---|
| 10 | −8 | −23 | −3 | 15 | −1 | 7 | 1 | 9 |
| 11 | −8 | −12 | −3 | 15 | 0 | 3 | 0 | −3 |
| 12 | −8 | −2 | −3 | 15 | −1 | −4 | 3 | 2 |
| 13 | −8 | 6 | −3 | 15 | 1 | 5 | −1 | 8 |
| 14 | −8 | 21 | −3 | 15 | 3 | 1 | −4 | 0 |
| 15 | −3 | −23 | −3 | 15 | 2 | 6 | 0 | −1 |
| 16 | −3 | −12 | −3 | 15 | 2 | −4 | 2 | −7 |
| 17 | −3 | −2 | −3 | 15 | −3 | −8 | 4 | 1 |
| 18 | −3 | 6 | −3 | 15 | 1 | 3 | 3 | 6 |
| 19 | −3 | 21 | −3 | 15 | 0 | 0 | −1 | −4 |
| 20 | 0.5 | −23 | −3 | 15 | 3 | 2 | 2 | −8 |

TABLE 2-continued

| Film No. | Retardation | | | | Variation in Retardation depending on Temperature | | Variation in Retardation depending on Humidity | |
|---|---|---|---|---|---|---|---|---|
| | Re(630) (nm) | Rth(630) (nm) | ΔRe*1 (nm) | ΔRth*2 (nm) | Re*3 (nm) | Rth*4 (mm) | Re*5 (nm) | Rth*6 (nm) |
| 21 | 0.5 | −12 | −3 | 15 | −1 | 9 | −3 | 3 |
| 22 | 0.5 | −2 | −3 | 15 | −4 | −3 | 1 | −4 |
| 23 | 0.5 | 6 | −3 | 15 | 0 | −4 | 0 | 0 |
| 24 | 0.5 | 21 | −3 | 15 | 2 | 8 | −2 | 3 |
| 25 | 4 | −23 | −3 | 15 | 4 | 0 | −3 | 0 |
| 26 | 4 | −12 | −3 | 15 | 4 | −1 | 0 | 2 |
| 27 | 4 | −2 | −3 | 15 | 0 | −7 | 1 | 9 |
| 28 | 4 | 6 | −3 | 15 | −2 | 3 | 2 | 7 |
| 29 | 4 | 21 | −3 | 15 | −3 | 4 | −1 | 3 |
| 30 | 9 | −23 | −3 | 15 | 0 | −2 | −2 | −4 |
| 31 | 9 | −12 | −3 | 15 | 1 | −5 | −1 | 5 |
| 32 | 9 | −2 | −3 | 15 | −3 | −9 | 1 | 3 |
| 33 | 9 | 6 | −3 | 15 | −1 | 5 | 3 | 5 |
| 34 | 9 | 21 | −3 | 15 | −2 | 4 | 1 | 4 |
| 50 | −8 | −30 | −3 | 15 | −1 | 7 | 1 | 9 |
| 51 | −8 | −23 | −3 | 50 | −1 | 7 | 1 | 9 |
| 52 | −20 | −23 | −3 | 15 | −1 | 20 | 1 | 9 |
| 53 | −8 | −23 | −15 | 15 | −1 | 7 | 15 | 20 |

*1|Re(400) − Re(700)|
*2|Rth(400) − Rth(700)|
*3|Re{50} − Re{25}|
*4|Rth{50} − Rth{25}|
*5|Re[80] − Re[10]|
*6|Rth[80] − Rth[10]|

Polarizing plates PL10 to PL34 were fabricated in the same manner as that for the polarizing plate PL1, for which, however, the above thermoplastic-resin films, Thermoplastic-resin film F10 to F34, respectively, were used in place of Thermoplastic-resin film F1.

Polarizing plates PL50 to PL53 were fabricated in the same manner as that for the polarizing plate PL2, for which, however, the above triacetyl cellulose films, Triacetyl cellulose films F50 to F53, respectively, were used in place of the TAC film F3.

Two of the polarizing plates PL10 to PL34 and PL50 to PL53 were used, and liquid-crystal display devices having the same constitution as in FIG. 1 were constructed. Concretely, as the panel-side polarizing plate PLa and the back-side polarizing plate PLb, the same polarizing plates were stuck to the surface and the back of the IPS-mode liquid-crystal cell produced in the above, thereby constructing liquid-crystal display devices LCD10 to LCD34 and LCD50 to LCD53. The polarizing plates were so disposed that the liquid-crystal cell-side protective film thereof could be each of the thermoplastic-resin films, Thermoplastic-resin films F10 to F34, or each of triacetyl cellulose films F50 to F53.

Thus constructed, the liquid-crystal display devices were evaluated in the same manner as above. The results are shown in the following Table.

TABLE 3

| LCD No. | PLa | PLb | Evaluation | |
|---|---|---|---|---|
| | | | Color Shift | Front Black Brightness |
| LCD10 | PL10 | PL10 | A | A |
| LCD11 | PL11 | PL11 | AA | A |
| LCD12 | PL12 | PL12 | AA | A |
| LCD13 | PL13 | PL13 | AA | A |
| LCD14 | PL14 | PL14 | A | A |

TABLE 3-continued

| LCD No. | PLa | PLb | Evaluation | |
|---|---|---|---|---|
| | | | Color Shift | Front Black Brightness |
| LCD15 | PL15 | PL15 | A | AA |
| LCD16 | PL16 | PL16 | AA | AA |
| LCD17 | PL17 | PL17 | AA | AA |
| LCD18 | PL18 | PL18 | AA | AA |
| LCD19 | PL19 | PL19 | A | AA |
| LCD20 | PL20 | PL20 | A | AA |
| LCD21 | PL21 | PL21 | AA | AA |
| LCD22 | PL22 | PL22 | AA | AA |
| LCD23 | PL23 | PL23 | AA | AA |
| LCD24 | PL24 | PL24 | A | AA |
| LCD25 | PL25 | PL25 | A | AA |
| LCD26 | PL26 | PL26 | AA | AA |
| LCD27 | PL27 | PL27 | AA | AA |
| LCD28 | PL28 | PL28 | AA | AA |
| LCD29 | PL29 | PL29 | A | AA |
| LCD30 | PL30 | PL30 | A | A |
| LCD31 | PL31 | PL31 | AA | A |
| LCD32 | PL32 | PL32 | AA | A |
| LCD33 | PL33 | PL33 | AA | A |
| LCD34 | PL34 | PL34 | A | A |
| LCD50 | PL50 | PL50 | C | A |
| LCD51 | PL51 | PL51 | C | A |
| LCD52 | PL52 | PL52 | C | C |
| LCD53 | PL53 | PL53 | C | A |

INDUSTRIAL APPLICABILITY

According to the present invention, it is possible to provide a liquid-crystal display device, in particular an IPS-mode liquid-crystal display device, that is free from a problem of display performance fluctuation to be caused by temperature- or humidity-change.

It is also possible to provide a liquid-crystal display device, in particular an IPS-mode liquid-crystal display device, that is free from problems of color shift in oblique directions and front contrast reduction to occur depending on the environment humidity and temperature.

CROSS-REFERENCE TO RELATED APPLICATIONS

This application claims benefit of priority under 35 USC 119 to Japanese Patent Application Nos. 2007-251971 filed on Sep. 27, 2007, and 2008-085530 filed on Mar. 28, 2008; and the entire contents of the applications are incorporated herein by reference.

The invention claimed is:

1. A liquid-crystal display device comprising:
a liquid-crystal cell which comprises:
   a pair of substrates disposed to face each other having an electrode on at least one of them, the electrode capable of forming an electric field containing a component running in parallel to the substrate, and
   a liquid-crystal layer, of which alignment is controlled, disposed between the pair of substrates; and
a pair of polarizing plates disposed to sandwich the liquid-crystal cell therebetween,
wherein at least one of the pair of polarizing plates comprises a polarizing element and a thermoplastic-resin film which comprises a lactone ring-having polymer as a major ingredient and satisfies the following formulas (I) and (II):

$-3 \leq Re(630) \leq 4$, and $-12 \leq Rth(630) \leq -1.7$ (I)

$|Re(400)-Re(700)| \leq 10$, and $1 \leq |Rth(400)-Rth(700)| \leq 15$ (II)

wherein $Re(\lambda)$ means retardation (nm) in plane at a wavelength $\lambda$, nm; and $Rth(\lambda)$ means retardation (nm) along the thickness direction at a wavelength $\lambda$ nm.

2. The liquid-crystal display device of claim 1, wherein a polarizing plate disposed at the backlight side, at least, is said polarizing plate comprising the thermoplastic-resin film.

3. The liquid-crystal display device of claim 1, wherein a polarizing plate disposed at the displaying plane side, at least, is said polarizing plate comprising the thermoplastic-resin film.

4. The liquid-crystal display device of claim 1, wherein both of polarizing plates disposed at the backlight side and the displaying plane side are said polarizing plates comprising the thermoplastic-resin film.

5. The liquid-crystal display device of claim 1, wherein $Re\{T\}$ and $Rth\{T\}$ (T means the temperature (° C.) at which the data is measured) of the thermoplastic-resin film at a wavelength of 550 nm satisfy the following formulas (III) and (IV):

$|Re\{50\}-Re\{25\}|<5$, (III)

$|Rth\{50\}-Rth\{25\}|<10$. (IV)

6. The liquid-crystal display device of claim 1, wherein $Re[H]$ and $Rth[H]$ (H means the relative humidity (%) at which the data is measured) of the thermoplastic-resin film at a wavelength of 550 nm satisfy the following formulas (V) and (VI):

$|Re[80]-Re[10]|<5$, (V)

$|Rth[80]-Rth[10]|<10$. (VI)

7. The liquid-crystal display device of claim 1, wherein the lactone ring-having polymer has a repetitive structure unit to be constructed by polymerization of at least one selected from (meth)acrylates, hydroxyl group-containing monomers, unsaturated carboxylic acids and monomers of the following formula (2),

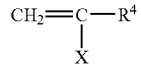

(2)

wherein $R^4$ represents a hydrogen atom or a methyl group; X represents a hydrogen atom, an alkyl group having from 1 to 20 carbon atoms, an aryl group, an acetate group, a cyano group, a group —CO—$R^5$ or a group —CO—O—$R^6$, wherein $R^5$ and $R^6$ each represents a hydrogen atom or an organic residue having from 1 to 20 carbon atoms.

8. The liquid-crystal display device of claim 7, wherein $Re\{T\}$ and $Rth\{T\}$ (T means the temperature (° C.) at which the data is measured) of the thermoplastic-resin film at a wavelength of 550 nm satisfy the following formulas (III) and (IV):

$|Re\{50\}-Re\{25\}|<5$, (III)

$|Rth\{50\}-Rth\{25\}|<10$; and (IV)

wherein $Re[H]$ and $Rth[H]$ (H means the relative humidity (%) at which the data is measured) of the thermoplastic-resin film at a wavelength of 550 nm satisfy the following formulas (V) and (VI):

$|Re[80]-Re[10]|<5$, (V)

$|Rth[80]-Rth[10]|<10$. (VI)

9. The liquid-crystal display device of claim 7, wherein the lactone ring-having polymer has a lactone ring structure of the following formula (1):

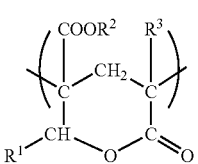

(1)

wherein $R^1$, $R^2$ and $R^3$ each independently represent a hydrogen atom, or an organic residue having from 1 to 20 carbon atoms, and the organic residue may contain an oxygen atom.

10. The liquid-crystal display device of claim 7, wherein the polarizing plate comprising the thermoplastic-resin film comprises on the opposite side of the thermoplastic-resin film with respect to the polarizing element a cellulose acylate film, a polycarbonate film, or a norbornene-based film.

11. The liquid-crystal display device of claim 7, wherein the polarizing plate comprising the thermoplastic-resin film comprises the thermoplastic-resin films on both sides of the polarizing element.

12. The liquid-crystal display device of claim 7, wherein the product of the thickness d (μm) of the liquid-crystal layer and the refractive anisotropy Δn thereof, Δn·d is from 0.2 to 1.2 μm.

13. The liquid-crystal display device of claim 7, wherein the lactone ring-having polymer has a repetitive structure unit obtained by polymerization of at least monomers of the formula (2) wherein the monomers of formula (2) are at least one of styrene and α-methylstyrene.

14. The liquid-crystal display device of claim 1, wherein the lactone ring-having polymer has a lactone ring structure of the following formula (1):

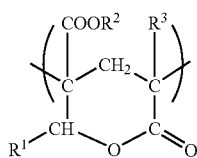

(1)

where $R^1$, $R^2$ and $R^3$ each independently represent a hydrogen atom, or an organic residue having from 1 to 20 carbon atoms, and the organic residue may contain an oxygen atom.

15. The liquid-crystal display device of claim 14, wherein Re{T} and Rth{T} (T means the temperature (° C.) at which the data is measured) of the thermoplastic-resin film at a wavelength of 550 nm satisfy the following formulas (III) and (IV):

|Re{50}−Re{25}|<5, (III)

|Rth{50}−Rth{25}|<10; and (IV)

wherein Re[H] and Rth[H] (H means the relative humidity (%) at which the data is measured) of the thermoplastic-resin film at a wavelength of 550 nm satisfy the following formulas (V) and (VI):

|Re[80]−Re[10]|<5, (V)

|Rth[80]−Rth[10]|<10. (VI)

16. The liquid-crystal display device of claim 1, wherein the lactone ring-having polymer in the thermoplastic-resin film is from 50 to 100% by mass.

17. The liquid-crystal display device of claim 1, wherein the lactone ring-having polymer has a weight-average molecular weight of from 1,000 to 2,000,000.

18. The liquid-crystal display device of claim 1, wherein the polarizing plate comprising the thermoplastic-resin film comprises on the opposite side of the thermoplastic-resin film with respect to the polarizing element a cellulose acylate film, a polycarbonate film, or a norbornene-based film.

19. The liquid-crystal display device of claim 1, wherein the polarizing plate comprising the thermoplastic-resin film comprises the thermoplastic-resin films on both sides of the polarizing element.

20. The liquid-crystal display device of claim 1, wherein the product of the thickness d (μm) of the liquid-crystal layer and the refractive anisotropy Δn thereof, Δn·d is from 0.2 to 1.2 μm.

21. The liquid-crystal display device of claim 1, wherein the mass reduction ratio of the lactone ring-having polymer, as measured within a range of from 150 to 300° C. through dynamic TG analysis, is at most 1%.

22. The liquid-crystal display device of claim 1, wherein the thermoplastic-resin film is disposed on the liquid-crystal cell through an adhesive layer.

23. The liquid-crystal display device of claim 1, wherein the liquid crystal display device is free from a layer having an optical characteristic between the thermoplastic-resin film and the liquid crystal cell.

24. The liquid-crystal display device of claim 1, wherein |Re(400)−Re(700)|≤3.

* * * * *